(12) United States Patent
Ono et al.

(10) Patent No.: US 9,467,587 B2
(45) Date of Patent: *Oct. 11, 2016

(54) INFORMATION PROCESSING APPARATUS, INFORMATION PROCESSING METHOD AND NON-TRANSITORY COMPUTER READABLE MEDIUM FOR CONTROLLING AN IMAGE FORMING APPARATUS

(71) Applicant: FUJI XEROX CO., LTD., Tokyo (JP)

(72) Inventors: Masafumi Ono, Yokohama (JP);
Manabu Hayashi, Yokohama (JP);
Naoya Nobutani, Yokohama (JP);
Shigeki Katayama, Yokohama (JP);
Yuki Noguchi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/739,807

(22) Filed: Jun. 15, 2015

(65) Prior Publication Data
US 2015/0281497 A1 Oct. 1, 2015

Related U.S. Application Data

(63) Continuation of application No. 14/106,141, filed on Dec. 13, 2013, now Pat. No. 9,088,682.

(30) Foreign Application Priority Data

Jun. 28, 2013 (JP) ................. 2013-136510

(51) Int. Cl.
*G06F 15/00* (2006.01)
*G06F 3/12* (2006.01)
(Continued)

(52) U.S. Cl.
CPC .......... *H04N 1/00896* (2013.01); *G03G 15/50* (2013.01); *G03G 15/5004* (2013.01); *G06K 15/4055* (2013.01); *H04N 2201/0094* (2013.01)

(58) Field of Classification Search
USPC ................................... 358/1.1–1.18
See application file for complete search history.

(56) References Cited

U.S. PATENT DOCUMENTS

| 2010/0011439 A1 | 1/2010 | Takiyama |
| 2012/0204046 A1 | 8/2012 | Baba et al. |
| 2014/0002843 A1 | 1/2014 | Miyamoto et al. |

FOREIGN PATENT DOCUMENTS

| JP | 2001-042849 A | 2/2001 |
| JP | 2001-336199 A | 12/2001 |

(Continued)

OTHER PUBLICATIONS

Nov. 11, 2014 Office Action issued in Japanese Application No. 2014-119883.

(Continued)

*Primary Examiner* — Douglas Tran
(74) *Attorney, Agent, or Firm* — Oliff PLC

(57) ABSTRACT

An information processing apparatus includes a sensor unit that senses a person within a first distance from the information processing apparatus and a second distance set to be closer to the information processing apparatus than the first distance, and a shifting unit that sets the information processing apparatus to a first mode when the person is sensed by the sensor unit, and shifts the information processing apparatus from the first mode to a second mode that consumes power less than in the first mode when the person is no longer sensed within the second distance by the sensor unit.

8 Claims, 10 Drawing Sheets

(51) Int. Cl.
    *G06K 1/00*     (2006.01)
    *H04N 1/00*     (2006.01)
    *G06K 15/00*     (2006.01)
    *G03G 15/00*     (2006.01)

(56) References Cited

FOREIGN PATENT DOCUMENTS

| | | |
|---|---|---|
| JP | 2002-006686 A | 1/2002 |
| JP | 2002-086846 A | 3/2002 |
| JP | 2007-307745 A | 11/2007 |
| JP | 2008-299745 A | 12/2008 |
| JP | 2010-174565 A | 8/2010 |
| JP | 2012-034294 A | 2/2012 |
| JP | 2012-142778 A | 7/2012 |
| JP | 2012-168211 A | 9/2012 |
| JP | 2012-256234 A | 12/2012 |
| JP | 2013-115649 A | 6/2013 |

OTHER PUBLICATIONS

Jan. 6, 2015 Office Action issued in Japanese Patent Application No. 2013-271781.

Jan. 28, 2014 Office Action issued in Japanese Patent Application No. 2013-136510.

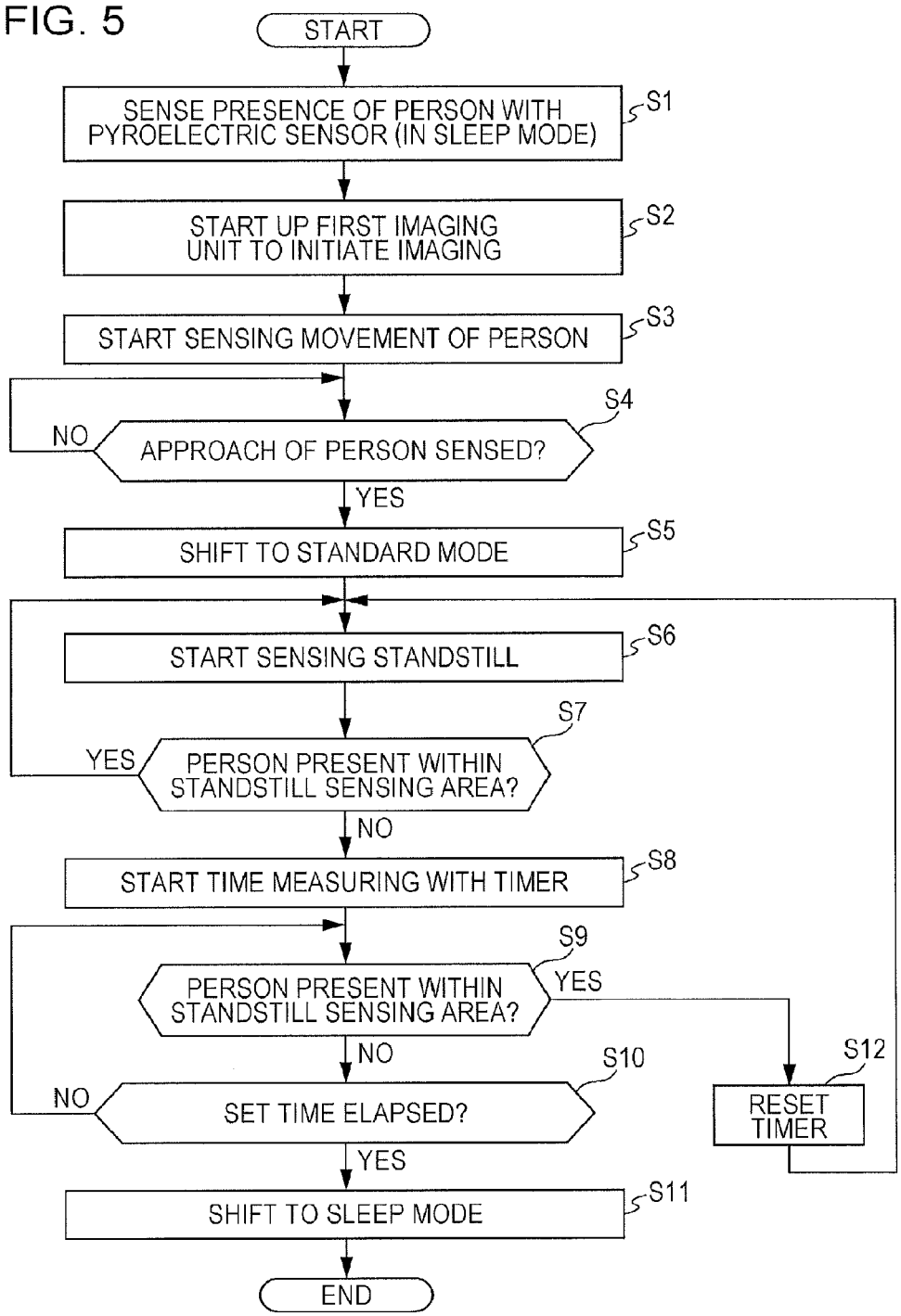

INFORMATION PROCESSING APPARATUS, INFORMATION PROCESSING METHOD AND NON-TRANSITORY COMPUTER READABLE MEDIUM FOR CONTROLLING AN IMAGE FORMING APPARATUS

CROSS-REFERENCE TO RELATED APPLICATIONS

This is a Continuation of application Ser. No. 14/106,141 filed Dec. 13, 2013, which claims priority under 35 U.S.C. §119 from Japanese Patent Application No. 2013-136510 filed Jun. 28, 2013. The disclosure of the prior applications are hereby incorporated by reference herein in their entirety.

BACKGROUND

Technical Field

The present invention relates to an information processing apparatus, an information processing method and a non-transitory computer readable medium.

SUMMARY

According to an aspect of the invention, there is provided an information processing apparatus. The information processing apparatus includes a sensor unit that, in accordance with an image captured at a first distance from the information processing apparatus, senses a presence of a person within a second distance set to be closer to the information processing apparatus than the first distance, and a shifting unit that sets the information processing apparatus to a first mode when the presence of the person is sensed by the sensor unit, and shifts the information processing apparatus from the first mode to a second mode that consumes power less than in the first mode when the presence of the person is no longer sensed within the second distance by the sensor unit.

BRIEF DESCRIPTION OF THE DRAWINGS

Exemplary embodiments of the present invention will be described in detail based on the following figures, wherein:

FIG. 5 is a flowchart illustrating a process to control the mode of the image forming apparatus;

DETAILED DESCRIPTION

Exemplary embodiments of the present invention are described with reference to the drawings. An information processing apparatus of the exemplary embodiments is applied to an image forming apparatus.

Figure 1:
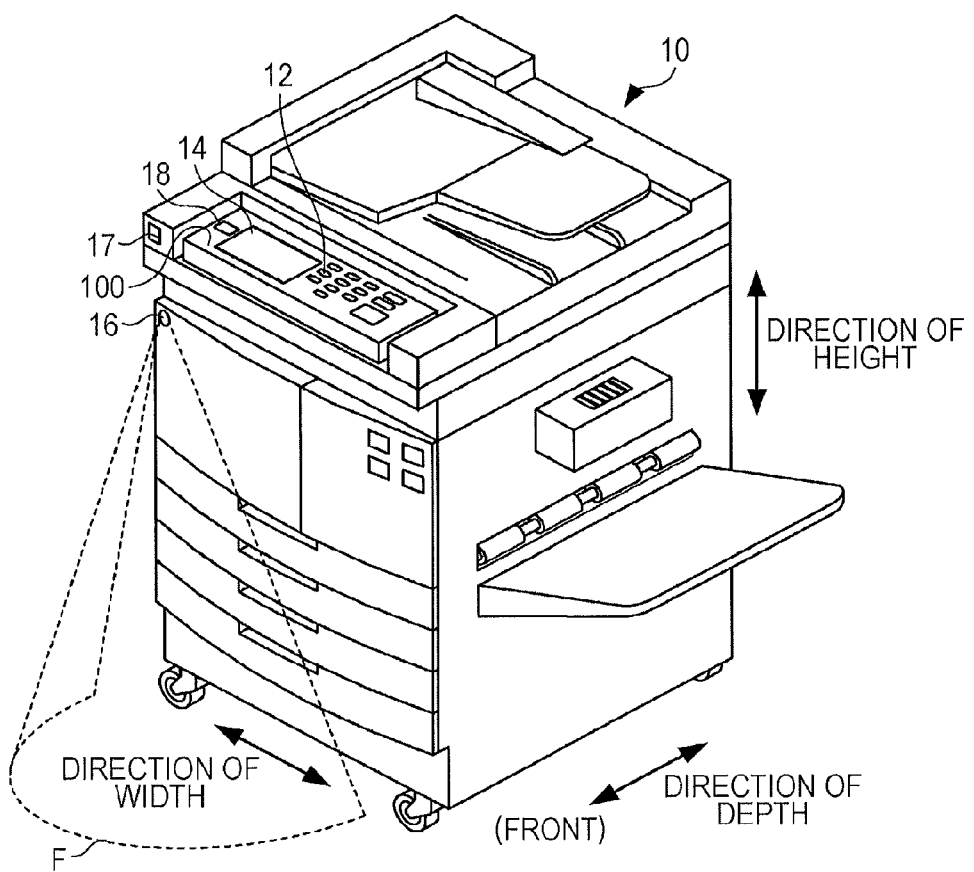
FIG. 1 is a perspective external view illustrating an image forming apparatus of an exemplary embodiment of the present invention.

FIG. 1 is a perspective external view illustrating the image forming apparatus 10 of an exemplary embodiment of the present invention. As illustrated in FIG. 1, the image forming apparatus 10 is of a console type, and performs information processing including a scan process, a copy process, and a facsimile transmission process. A person who uses the image forming apparatus 10 (namely, a user) may stand in front of the image forming apparatus 10 and operates an operation panel 100. The operation panel 100 is arranged on a top front position of the image forming apparatus 10. The operation panel 100 includes an operation unit 12, a display 14, and a second imaging unit 18. In order to sense the presence of a person present in front of the image forming apparatus 10, the image forming apparatus 10 further includes a pyroelectric sensor 16 and a first imaging unit 17. A sensing area F of FIG. 1 is an area where the pyroelectric sensor 16 may sense the presence of a person. The first imaging unit 17 is arranged higher than the pyroelectric sensor 16 in the direction of height of the image forming apparatus 10.

The image forming apparatus 10 operates in one of a standard mode and a sleep mode, different from each other in terms of power consumption. The standard mode is one example of a "first mode" in which the image forming apparatus 10 performs the information processing in response to an operation performed by the user. In the standard mode, each element of the image forming apparatus 10 is supplied with power to be used to execute the information processing. The sleep mode is an example of a "second mode" in which at least part of the operation of the image forming apparatus 10 is temporarily suspended. In the sleep mode, power supplying to at least part of the image forming apparatus 10 is suspended. The image forming apparatus 10 consumes power less than in the standard mode. When the image forming apparatus 10 operates in the sleep mode, the controller 11, the pyroelectric sensor 16, and the first imaging unit 17 are supplied with power so that each of these units remains operative in the sleep mode.

Figure 2:
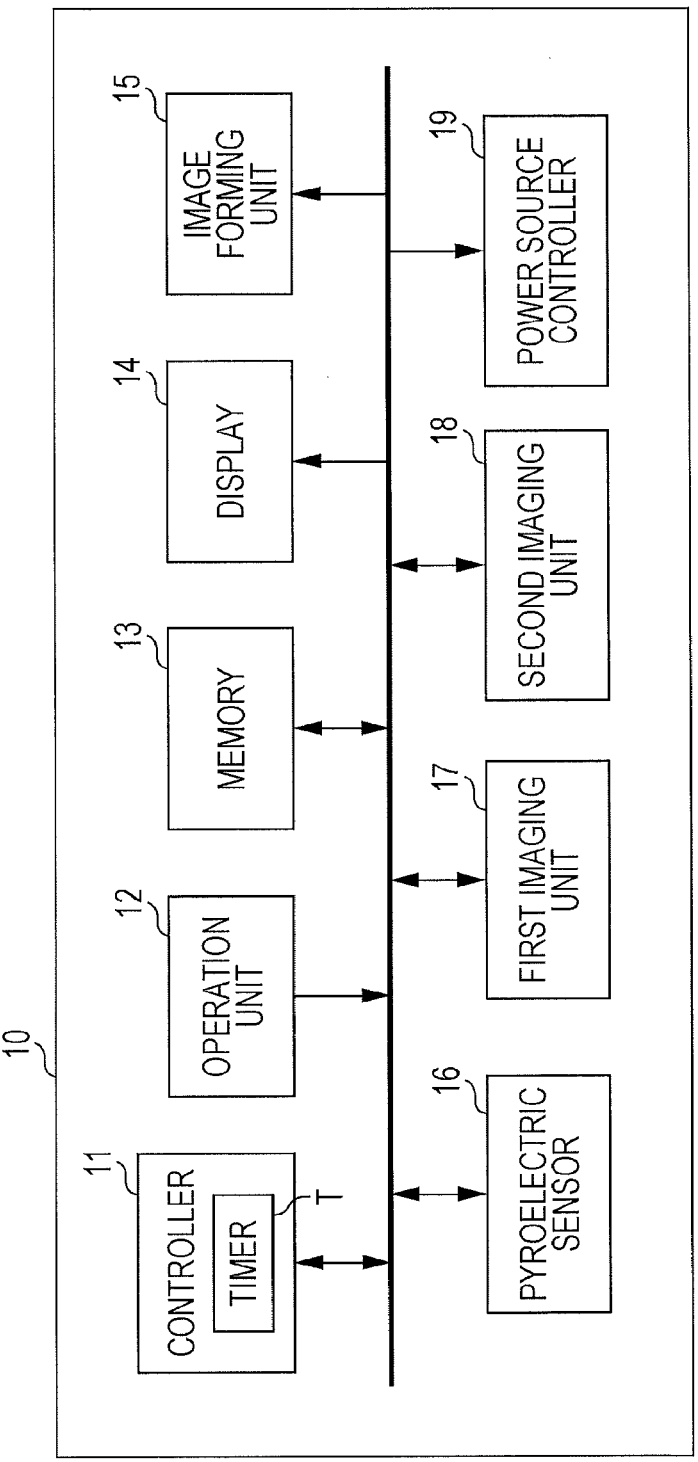
FIG. 2 is a block diagram illustrating the hardware configuration of the image forming apparatus.

FIG. 2 is a block diagram illustrating the hardware configuration of the image forming apparatus 10. As illustrated in FIG. 2, the image forming apparatus 10 includes controller 11, operation unit 12, memory 13, display 14, image forming unit 15, pyroelectric sensor 16, first imaging unit 17, second imaging unit 18, and power source controller 19.

The controller 11 includes a processor that includes a central processing unit (CPU), a read-only memory (ROM), and a random-access memory (RAM). The CPU controls each of the units of the image forming apparatus 10 by reading a program stored on the ROM or the memory 13 onto the RAM, and executing the program. The controller 11 further includes an image processing unit such as an application specific integrated circuit (ASIC). The image processing unit controls the image processing including image analysis on the image forming apparatus 10. The controller 11 further includes a timer T as a time measuring unit to measure time.

The operation unit 12 includes multiple controls. The operation unit 12 receives an operation performed by the user, and then supplies an operation signal responsive to the received operation to the controller 11. The memory 13 includes a hard disk device, for example, and stores a control program to be executed by the controller 11. The display 14 includes a liquid-crystal display, for example, and is arranged next to the operation unit 12 in the direction of width of the image forming apparatus 10. The display 14 is a display device that displays an image (screen) thereon. The image forming unit 15 is a printer that forms an image on a sheet through an electrophotographic process, for example.

The pyroelectric sensor 16 includes a pyroelectric element that senses a quantity of infrared light within the sensing area F, and supplies the sensing result of the quantity of infrared light to the controller 11. Each of the first imaging unit 17 and the second imaging unit 18 includes an imaging lens and an imaging element, such as a charge-coupled device (CCD), and captures an image (moving image here). The first imaging unit 17 has a particularly wide-angle lens (such as a fish-eye lens), and images the front area in front of the image forming apparatus 10 at an angle wider than a standard imaging lens. The second imaging unit 18 is arranged to be next to the display 14 in the direction of width of the image forming apparatus 10. The second imaging unit 18 is located at a position that allows the face of a user to be imaged. This is intended to allow the second imaging unit 18 to authenticate the face of the user using the captured image.

The power source controller 19 is electrically connected to a power source, such as a commercial power source (not illustrated here), and controls power supplying from the power source to each unit of the image forming apparatus 10. For example, when the controller 11 sets the image forming apparatus 10 to the standard mode or the sleep mode, the power source controller 19 controls the power supplying to each unit of the image forming apparatus 10 in accordance with the set mode.

A power source line connected to each unit of the image forming apparatus 10 is not illustrated in FIG. 2.

The image forming apparatus 10 also includes, besides the units described above, units of an ordinary image forming apparatus, such as an image reading unit to read the image of a document or the like, and a communication unit to communicate with an external device. The image forming apparatus 10 further includes a unit that performs information processing in conjunction with the peripheral device 20, for example, includes a connection unit to be connected to the peripheral device 20 (such as a post-processing device) to be described below. The peripheral device 20 is not particularly limited to any specific structure. The peripheral device 20 in one example is a large-capacity sheet container device that stores sheets to be supplied to the image forming apparatus 10 or sheets discharged from the image forming apparatus 10.

An example of the information processing of the image forming apparatus 10 is described below. When the copy process is performed, the controller 11 generates image data by causing the image reading unit to read the image of the document, and causes the image forming unit 15 to form the image on a sheet in accordance with the image data. When the scan process is performed, the controller 11 generates image data by causing the image reading unit to read the image of a document, and stores the image data on the memory 13 or transmits the image data via a network. When the facsimile transmission process is performed, the controller 11 generates image data by causing the image reading unit to read the image of a document, and transmits the image data in a facsimile transmission via a telephone line (not illustrated).

Figure 3:
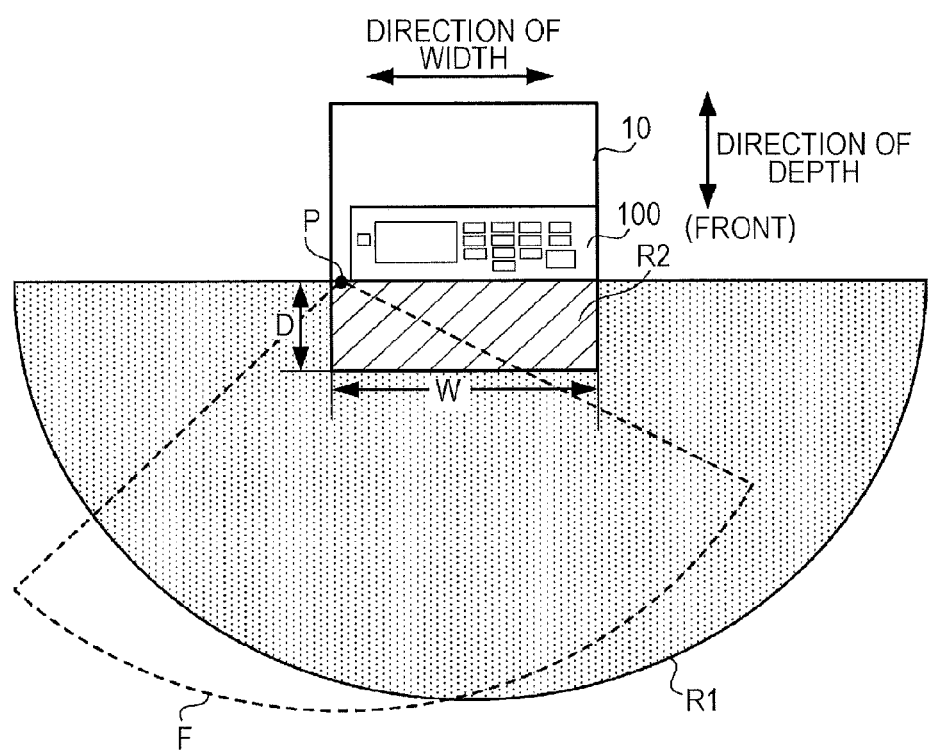
FIG. 3 illustrates an area where the presence of a person is sensed by the image forming apparatus.

FIG. 3 illustrates an area where the presence of a person is detected by the image forming apparatus. FIG. 3 is a plan view of the image forming apparatus 10 and the surrounding area thereof that are viewed from above the image forming apparatus 10 in the direction of height of the image forming apparatus 10.

As illustrated in FIG. 3, the sensing area F of the pyroelectric sensor 16 is formed in front of the image forming apparatus 10 and has a generally sector shape in a plan view if viewed from above in the direction of height. If a person who is going to use the image forming apparatus 10 approaches the image forming apparatus 10, the person first enters the sensing area F.

An approach sensing area R1 of FIG. 3 is formed in front of the image forming apparatus 10 and has a generally sector shape in a plan view if viewed from above in the direction of height. The approach sensing area R1 is set up to generally include the sensing area F. The person who approaches the image forming apparatus 10 enters the approach sensing area R1. The approach sensing area R1 is an example of an area of a "first distance" from the image forming apparatus 10. A location labeled "P" in FIG. 3 where the first imaging unit 17 is arranged is referred to as the location of the image forming apparatus 10.

The approach sensing area R1 is a sector having a central angle of 180 degrees (semi-circle), but the central angle may be an angle other than 180 degrees. However, the first imaging unit 17 is set up so that the first imaging unit 17 has at least the entire approach sensing area R1 as an imaging area.

A standstill sensing area R2 is set up in front of the image forming apparatus 10 and has a rectangular shape in a plan view if viewed from above in the direction of height. The rectangular area has a length W in the direction of width of the image forming apparatus 10 and a length D in the direction of depth of the image forming apparatus 10. The length W in the direction of width of the standstill sensing area R2 is approximately equal to the length of the image forming apparatus 10 in the direction of width thereof. The standstill sensing area R2 is an example of an area of a "second distance" from the image forming apparatus 10, and is closer to the image forming apparatus 10 than the approach sensing area R1. For this reason, the entire standstill sensing area R2 is set up to be enclosed in the approach sensing area R1. The user of the image forming apparatus 10 enters the standstill sensing area R2, and then stays within the standstill sensing area R2 to perform an operation using the operation panel 100.

The controller 11 senses a person within each of the approach sensing area R1 and the standstill sensing area R2 by analyzing the image captured by the first imaging unit 17. There is more detail on this below. The approach sensing area R1 and the standstill sensing area R2 are not necessarily set up at a precision level exactly as illustrated FIG. 3, and it is sufficient enough if the approach sensing area R1 and the standstill sensing area R2 are set up at a precision level as high as the level estimated from the captured image of the first imaging unit 17.

Figure 4:
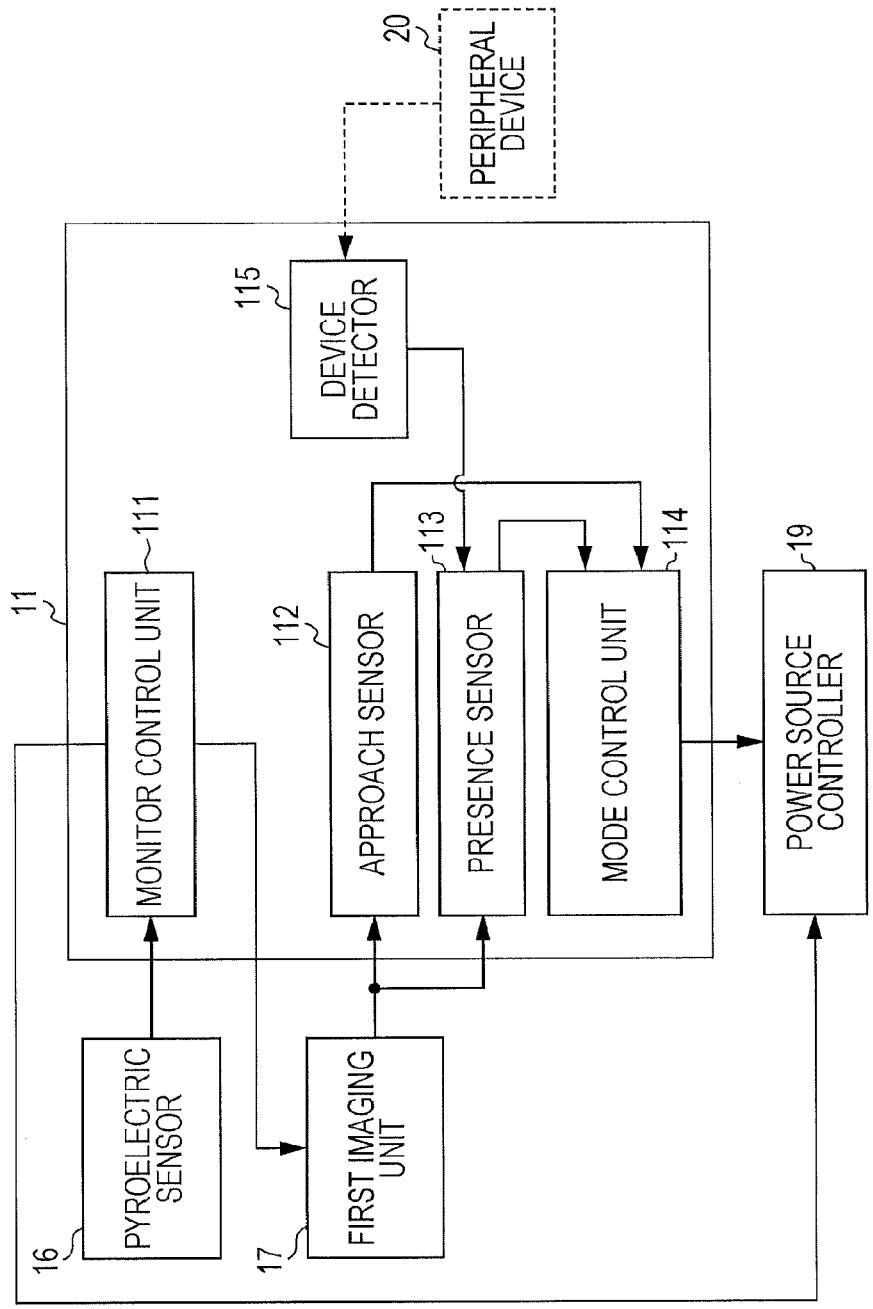
FIG. 4 is a functional block diagram illustrating the image forming apparatus.

FIG. 4 is a functional block diagram illustrating the controller 11 in the image forming apparatus 10. As illustrated in FIG. 4, the controller 11 performs functions corresponding to monitor control unit 111, approach sensor 112, presence sensor 113, mode control unit 114, and device detector 115.

The monitor control unit 111 controls the first imaging unit 17 by monitoring a quantity of infrared light from the pyroelectric sensor 16 while the image forming apparatus 10 operates in the sleep mode. More specifically, upon sensing the presence of a person within the sensing area F in response to the sensing result of the infrared light of the pyroelectric sensor 16, the monitor control unit 111 starts up the first imaging unit 17 to start imaging. In this case, the monitor control unit 111 instructs the power source controller 19 to supply power to the first imaging unit 17.

The approach sensor 112 senses the approach of a person within the approach sensing area R1. The approach sensor 112 obtains the captured image of the approach sensing area R1 from the first imaging unit 17, and senses the approach of the person to the image forming apparatus 10 in accordance with the captured image. For example, the approach sensor 112 analyzes the captured image, and senses the distance from the image forming apparatus 10 to the person and the movement of the person. The approach sensor 112 thus senses the approach of the person within the approach sensing area R1. The approach sensor 112 is an example of a "first sensor unit".

The presence sensor 113 senses the presence of a person within the standstill sensing area R2. The presence sensor 113 obtains the captured image of the approach sensing area R1 from the first imaging unit 17, and senses the presence of the person within the standstill sensing area R2 in accordance with the captured image. For example, the presence sensor 113 analyzes the captured image, and senses the distance from the image forming apparatus 10 to the person and the location of the person. The presence sensor 113 thus senses the presence of the person within the standstill sensing area R2. The presence sensor 113 is an example of a "second sensor unit", or a "sensor unit" that senses the presence of the person within the second distance closer to the image forming apparatus 10 than the first distance in accordance with the image captured at the first distance from the image forming apparatus 10.

The mode control unit 114 controls the mode in which the image forming apparatus 10 operates. When another mode is set in the image forming apparatus 10, the mode control unit 114 instructs the power source controller 19 to supply power in response to the set mode and performs a control operation to start up or suspend operations of each unit of the image forming apparatus 10. For example, if the approach sensor 112 has sensed the approach of a person with the image forming apparatus 10 in the sleep mode, the mode control unit 114 shifts the image forming apparatus 10 from the sleep mode to the standard mode. When the presence sensor 113 senses the presence of the person, the mode control unit 114 sets the image forming apparatus 10 to be in the standard mode. When the presence sensor 113 no longer senses the presence of the person, the mode control unit 114 shifts the image forming apparatus 10 to the sleep mode. The mode control unit 114 is an example of a "shifting unit".

The mode control unit 114 may set the image forming apparatus 10 to the mode in response to another trigger. For example, upon receiving an operation to shift to the sleep mode from the operation unit 12, the mode control unit 114 shifts the image forming apparatus 10 to the sleep mode.

The device detector 115 detects the connection of the peripheral device 20 to the image forming apparatus 10. When the device detector 115 has detected the connection of the peripheral device 20, the presence sensor 113 varies the standstill sensing area R2 in response to the peripheral device 20, the connection of which has been detected. The approach sensing area R1 remains unchanged regardless of the detection results by the device detector 115. The peripheral device 20 may be a device arranged external to the image forming apparatus 10. The device detector 115 is an example of a "detector unit".

As described above, the controller 11 functions as a power control device that controls power to the image forming apparatus 10.

The hardware and functional configurations of the image forming apparatus 10 have been described. The image forming apparatus 10 may include a human detector mounted on a module. The pyroelectric sensor 16, the first imaging unit 17 and the second imaging unit 18 are mounted on the module that implements the functions of the monitor control unit 111, the approach sensor 112, the presence sensor 113, and the device detector 115. In such a case, the controller 11 controls the human detector, and performs a control process responsive to sensing results of the human detector as to the approach and the presence of a person.

FIG. 5 is a flowchart illustrating a process to control the mode of the image forming apparatus 10. FIG. 6 and FIG. 7 illustrate examples of the change of the location of a person with time nearby the image forming apparatus 10. As FIG. 3, FIGS. 6 and 7 and, as described below, FIG. 9 and FIG. 10 illustrate plan views of the image forming apparatus 10 and the surround area thereof viewed from above the image forming apparatus 10 in the direction of height of the image forming apparatus 10. The operation of the image forming apparatus 10 is described below with the standstill sensing area R2 set up as illustrated in FIG. 3, in other words, with the peripheral device 20 not connected to the image forming apparatus 10.

Figure 6A:
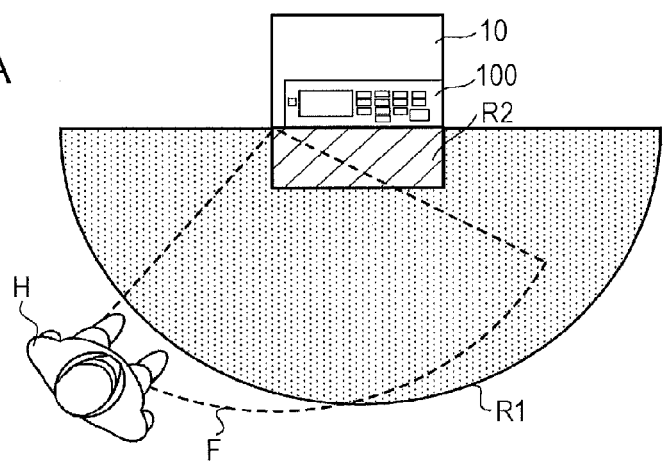
FIGS. 6A through 6C illustrate an example of the change of the location of a person nearby the image forming apparatus with time.

With the image forming apparatus 10 operating in the sleep mode, the controller 11 monitors the sensing results of the quantity of infrared light with the pyroelectric sensor 16, and determines whether a person is present within the sensing area F. When a person H enters the sensing area F as illustrated in FIG. 6A, the controller 11 senses the presence of the person within the sensing area R in response to the sensing results of the pyroelectric sensor 16 (step S1).

If the presence of the person is sensed within the sensing area F, the controller 11 instructs the power source controller 19 to start the power supplying to the first imaging unit 17 and starts the first imaging unit 17 to begin imaging the approach sensing area R1 (step S2). When the first imaging unit 17 starts imaging, the controller 11 analyzes the image obtained from the first imaging unit 17, and then starts sensing the movement of the person by analyzing the image obtained from the first imaging unit 17 (step S3).

In the operation of sensing the movement of the person in step S3, the controller 11 estimates the distance from the image forming apparatus 10 to the person while calculating a motion vector indicating the movement of the person. The operation of sensing the movement of the person may be a related art technique. For example, the controller 11 estimates the distance from the image forming apparatus 10 to the person based on the magnitude of a part of the body of the person detected from the captured image. The controller 11 also compares sequentially multiple frames of the captured images by performing a framing operation on the captured images from the first imaging unit 17. In this case, the controller 11 senses the toe as the part of the body of the person, and calculates the motion vector by analyzing the movement of the sensed part. For example, the controller 11 corrects the captured image from the first imaging unit 17 (into a plan view form), and then senses the movement of the person.

Figure 6B:
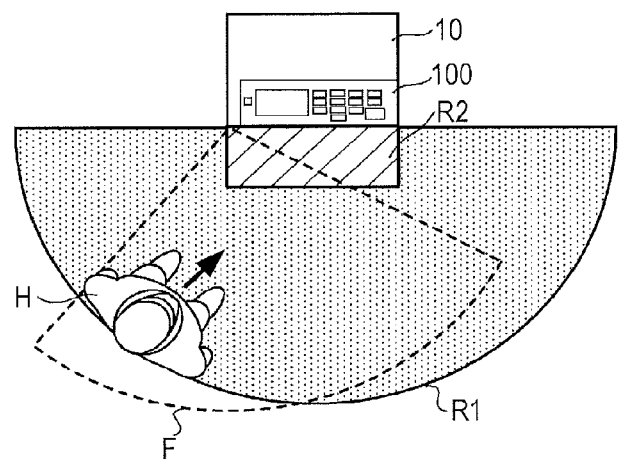

The controller 11 determines whether the approach of the person is detected within the approach sensing area R1 (step S4). As illustrated in FIG. 6B, the controller 11 may determine that the person H is within the approach sensing area R1, and that the person H moves toward the image forming apparatus 10 (as denoted by an arrow in FIG. 6B). The controller 11 then determines that the approach of the person has been sensed (yes branch from step S4).

Note that during the period throughout which the pyroelectric sensor 16 senses the presence of the person, the controller 11 performs the operation to sense the movement of the person, and repeats the operation in step S4 to determine whether the person approaches (no branch from step S4).

In the yes branch from step S4, the controller 11 shifts the image forming apparatus 10 from the sleep mode to the standard mode (step S5). The controller 11 instructs the power source controller 19 to perform the power supplying to each unit of the image forming apparatus 10 in response to the standard mode and starts up each unit of the image forming apparatus 10.

The controller 11 does not shift the image forming apparatus 10 to the standard mode immediately when the presence of a person has been sensed within the approach sensing area R1 but shifts the image forming apparatus 10 to the standard mode when the approach of the person to the image forming apparatus 10 has been sensed. This reduces the possibility that the image forming apparatus 10 is shifted to the standard mode only when the person H simply passes through the approach sensing area R1.

The controller 11 starts an operation to sense the presence (standstill) of the person within the standstill sensing area R2 (step S6). The controller 11 senses a part of the body of the person by analyzing the captured image from the first imaging unit 17, and senses the presence of the person within the standstill sensing area R2 in accordance with the location and the size of the sensed part. For example, the controller 11 estimates the distance from the image forming apparatus 10 to the person in response to the size of the detected part of the body, and identifies a direction to the location of the person based on the location of the sensed part of the body.

Figure 6C:
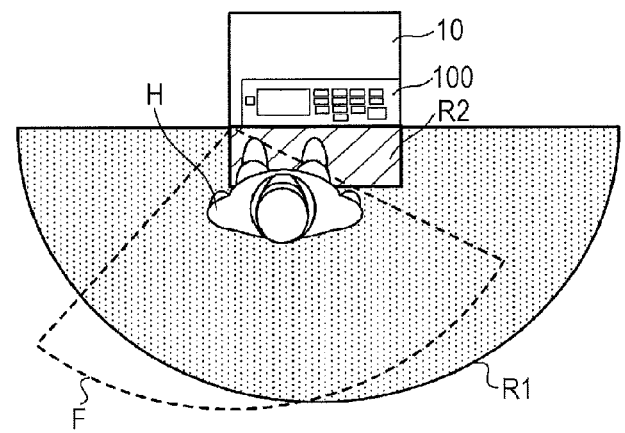

The controller 11 determines whether the person is present within the standstill sensing area R2 (step S7). If the controller 11 determines with the person H at the location as illustrated in FIG. 6C that the person is present within the standstill sensing area R2 (yes from step S7), processing returns to step S6. The controller 11 repeats the operation to sense the presence of the person within the standstill sensing area R2 with the image forming apparatus 10 set in the standard mode until the presence of the person is no longer sensed within the standstill sensing area R2.

Figure 7A:
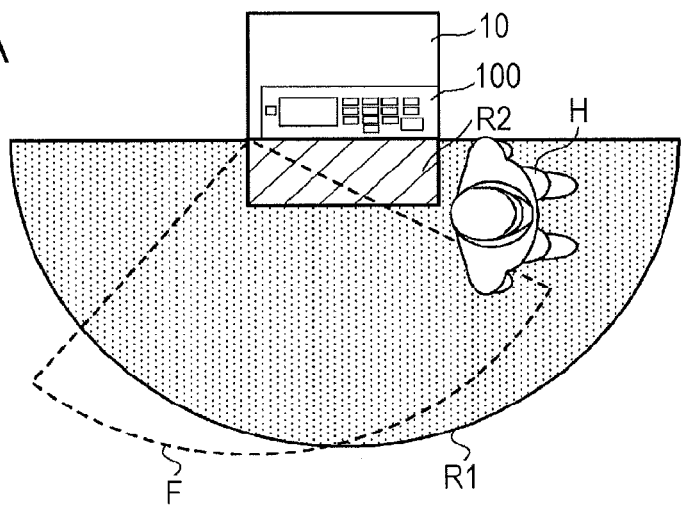
FIGS. 7A through 7C illustrate an example of the change of the location of the person nearby the image forming apparatus with time.

As illustrated in FIG. 7A, the person H may move out of the standstill sensing area R2 possibly because of the completion of the job with the image forming apparatus 10. In such a case, the controller 11 determines that the person is no longer present within the standstill sensing area R2 (no branch from step S7), and proceeds to step 8. The controller 11 starts to measure time (step S8). In other words, using the timer T, the controller 11 measures elapsed time from when the person is no longer present within the standstill sensing area R2.

Figure 7B:
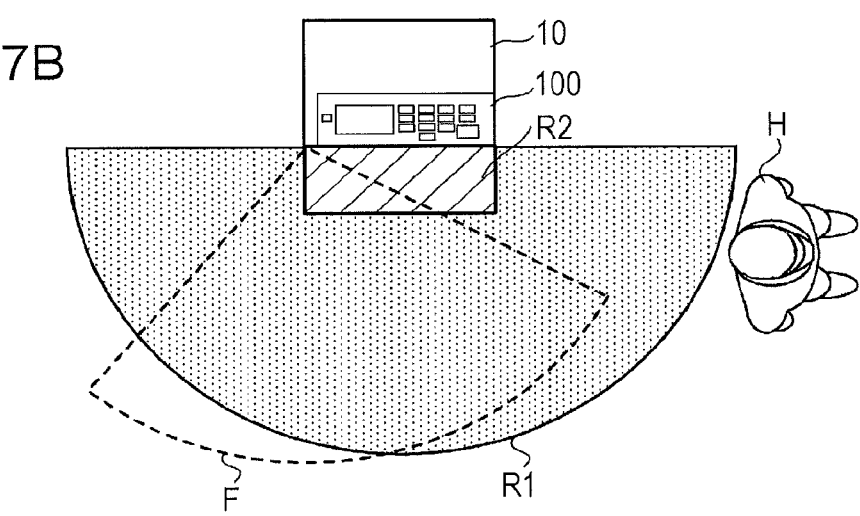

The controller 11 determines whether a person is present with the standstill sensing area R2 (step S9). In the operation of step S9, the controller 11 determines whether the presence of the person is detected again once the person has been no longer present within the standstill sensing area R2. As illustrated in FIG. 7B, the person H may gradually go away from the image forming apparatus 10 and no person may be present within the standstill sensing area R2. The controller 11 then determines that the answer to the operation in step S9 is "no", and proceeds to step S10.

The controller 11 determines whether the time set in the timer T has elapsed (step S10). The set time may be 1 minute, for example. Time different from 1 minute may also be set. If the controller 11 determines that the set time has not elapsed (no branch from step S10), processing returns to step S9. More specifically, the controller 11 determines in each of the steps S9 and S10 whether the period throughout which no person is present within the standstill sensing area R2 is equal to the set time.

Upon determining in step S10 that the set time of the timer T has elapsed since the start of the time measurement of the timer T (yes branch from step S10), the controller 11 shifts the image forming apparatus 10 from the standard mode to the sleep mode (step S11). In this operation, the controller 11 instructs the power source controller 19 to supply power for the sleep mode to each unit of the image forming apparatus 10 and suspends the operation of each unit in the image forming apparatus 10 that is to be suspended during the sleep mode. When the presence of the person is no longer sensed within the sensing area F, the controller 11 suspends the operation of the first imaging unit 17.

Figure 7C:
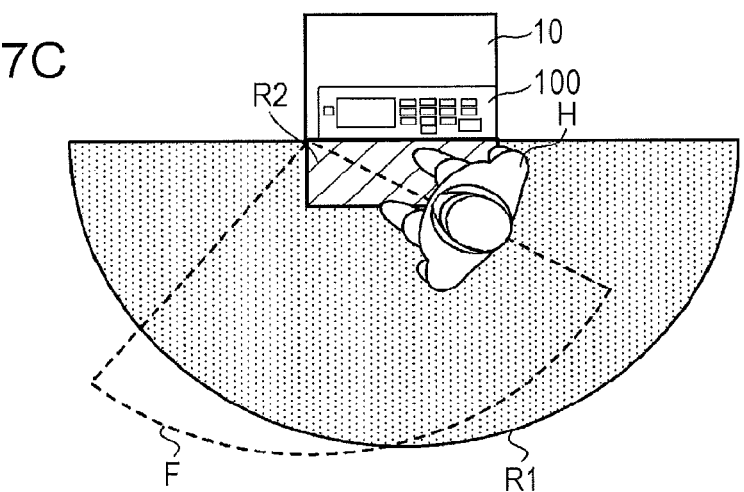

As illustrated in FIG. 7C, the controller 11 may sense the presence of a person again on the elapse of the set time from when the person is no longer present within the standstill sensing area R2 after the start of the time measurement of the timer T. In such a case, the controller 11 determines that the answer to the operation in step S9 is "yes", and processing proceeds to step S12. The controller 11 stops the time measurement of the timer and resets the timer T (step S12). The controller 11 stops shifting to the sleep mode initiated by the no-presence of the person within the standstill sensing area R2, and then returns to step S6. In other words, the controller 11 again executes the operation that applies to the case when the person is present within the standstill sensing area R2.

It is assumed herein that the same person, i.e., the person H has returned back. If a different person comes into the standstill sensing area R2, the controller 11 also determines that the answer to step S9 is "yes".

The general flow of the process illustrated in FIG. 5 has been described. An operation of setting the standstill sensing area R2 in response to the peripheral device 20 is described below. If the peripheral device 20 is connected to the image forming apparatus 10, the controller 11 varies the standstill sensing area R2 in response to the connected peripheral device 20 in step S6.

Figure 8:
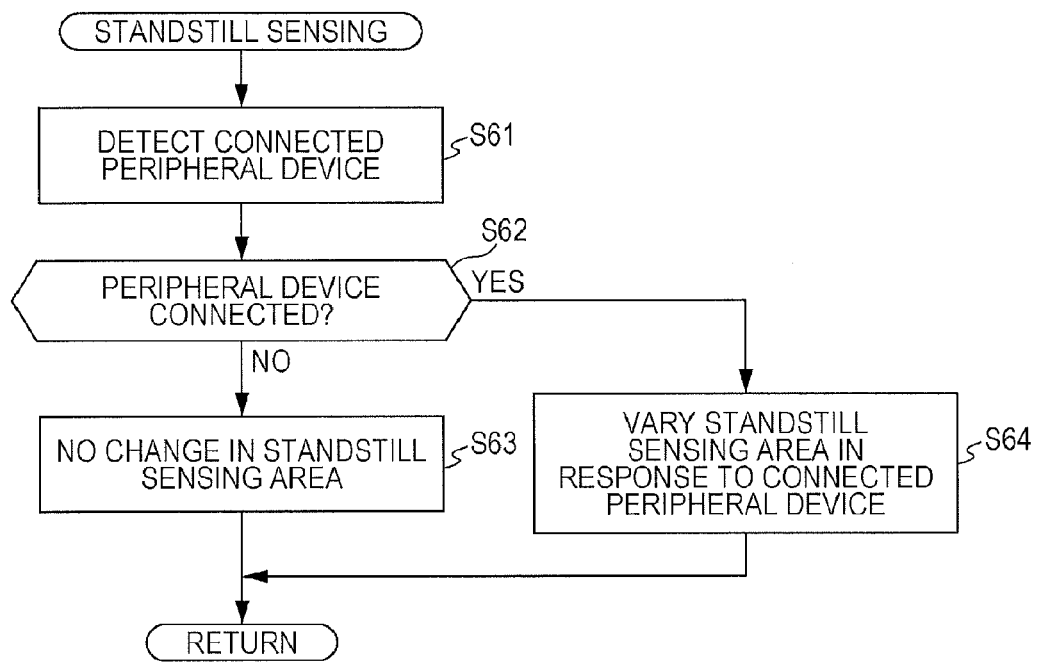
FIG. 8 is a flowchart illustrating a process of setting a standstill sensing area of the image forming apparatus.

FIG. 8 is a flowchart illustrating a process of setting the standstill sensing area R2 of the image forming apparatus. Each of the operations of FIG. 8 is executed prior to the start of the operation to sense the presence of the person within the standstill sensing area R2. FIG. 9 and FIG. 10 illustrate setting examples of the standstill sensing area R2.

The controller 11 detects the connection of the peripheral device 20 (step S61). More specifically, the controller 11 detects whether the peripheral device 20 is connected. If the peripheral device 20 is connected, the controller 11 detects the type of the peripheral device 20.

The controller 11 automatically detects whether the peripheral device 20 is connected or not and detects the type of the peripheral device 20 if the peripheral device 20 is connected. Optionally, the controller 11 may detect whether the peripheral device 20 is connected or not based on information manually set by the user.

The controller 11 determines whether the peripheral device 20 is connected (step S62). Upon determining that the peripheral device 20 is not connected (no branch from step S62), the controller 11 does not vary the standstill sensing area R2 (step S63). More specifically, the controller 11 sets up the standstill sensing area R2 having a length of W in the direction of width and a length of D in the direction of depth of the image forming apparatus 10 in a plan view viewed from above the image forming apparatus 10 in the direction of height of the image forming apparatus 10 (see FIG. 3).

On the other hand, upon determining that the peripheral device 20 is connected (yes branch from S62), the controller 11 varies the standstill sensing area R2 responsive to the type of the connected peripheral device 20 (step S64). The type of the peripheral device 20 is identified by a model number of the peripheral device 20. The type of the peripheral device 20 may also be identified by any other identification thereof. The relationship between the type of the peripheral device 20 and the standstill sensing area R2 is listed in a management table (not illustrated) to be stored on the memory 13. Referring to the management table, the controller 11 sets up the standstill sensing area R2.

In the operation of step S64, the controller 11 varies the standstill sensing area R2 in accordance with the location and the dimensions of the peripheral device 20.

Figure 9A:
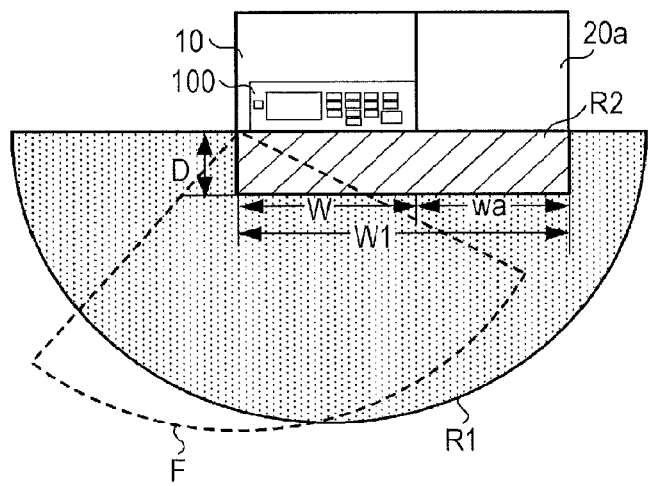
FIGS. 9A through 9C illustrate a setting example of the standstill sensing area of the image forming apparatus.

As illustrated in FIG. 9A, a peripheral device 20a may now be mounted next to the right side (if viewed from the user) of the image forming apparatus 10 in the direction of width of the image forming apparatus 10, and the length of the peripheral device 20a in the direction of width may be wa. In such a case, in order to set up the standstill sensing area R2 in front of all the front sides of the image forming apparatus 10 and the peripheral device 20a, the controller 11 sets the sum W1 (=W+wa) of the length W of the image forming apparatus 10 in the direction of width thereof and the length wa of the peripheral device 20a in the direction of width thereof to be the length in the direction of width of the standstill sensing area R2. The controller 11 sets the length in the direction of depth to be D in the same manner as in FIG. 3.

Figure 9B:
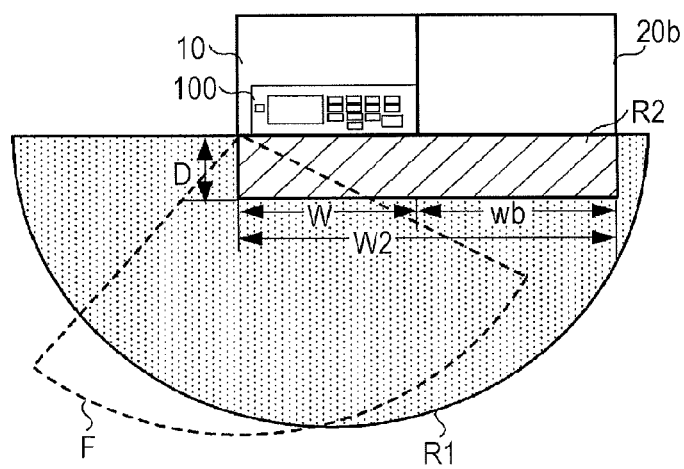

As illustrated in FIG. 9B, a peripheral device 20b may now be mounted next to the right side of the image forming apparatus 10 in the direction of width of the image forming apparatus 10, and the length of the peripheral device 20b in the direction of width may be wb (wb>wa). In such a case, in order to set up the standstill sensing area R2 in front of all the front sides of the image forming apparatus 10 and the peripheral device 20b, the controller 11 sets the sum W2 (=W+wb) of the length W of the image forming apparatus 10 in the direction of width thereof and the length wb of the peripheral device 20b in the direction of width thereof to be the length in the direction of width of the standstill sensing area R2. The controller 11 sets the length in the direction of depth to be D in the same manner as in FIG. 3.

Figure 9C:
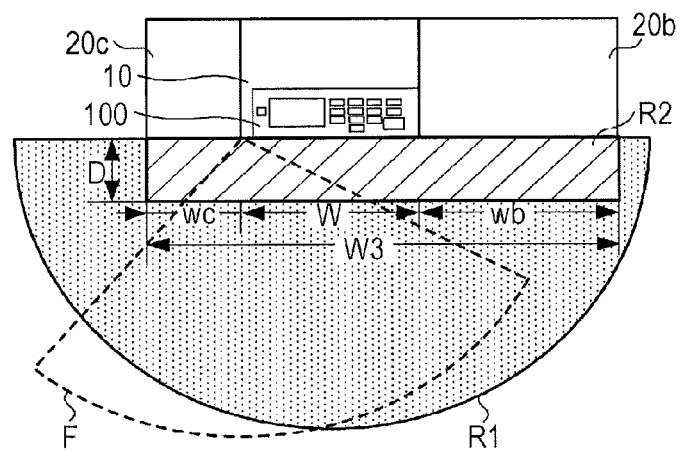

As illustrated in FIG. 9C, in addition to the peripheral device 20b, a peripheral device 20c may now be mounted next to the left side (if viewed from the user) of the image forming apparatus 10 in the direction of width of the image forming apparatus 10, and the length of the peripheral device 20c in the direction of width may be wc. In such a case, in order to set up the standstill sensing area R2 in front of all the front sides of the image forming apparatus 10 and the peripheral devices 20b and 20c, the controller 11 sets the sum W3 (=W+wb+wc) of the length W of the image forming apparatus 10 in the direction of width thereof, the length wb of the peripheral device 20b in the direction of width thereof and the length wc of the peripheral device 20c in the direction of width thereof to be the length in the direction of width of the standstill sensing area R2. The controller 11 sets the length in the direction of depth to be D in the same manner as in FIG. 3.

If the peripheral device 20 is arranged next to the image forming apparatus 10 in the direction of width of the image forming apparatus 10, the user of the image forming apparatus 10 may work not only in front of the image forming apparatus 10 but also in front of the peripheral device 20. In such a case, if the standstill sensing area R2 is set up only in front of the image forming apparatus 10 as illustrated in FIG. 3, the image forming apparatus 10 may be shifted to the sleep mode while the user is still working. If the standstill sensing area R2 is varied in response to the connected peripheral device 20, the controller 11 senses the user working in front of the peripheral device 20 staying within the standstill sensing area R2. In other words, the standstill sensing area R2 is smaller when the peripheral device 20 is not connected than when the peripheral device 20 is connected.

Figure 10A:
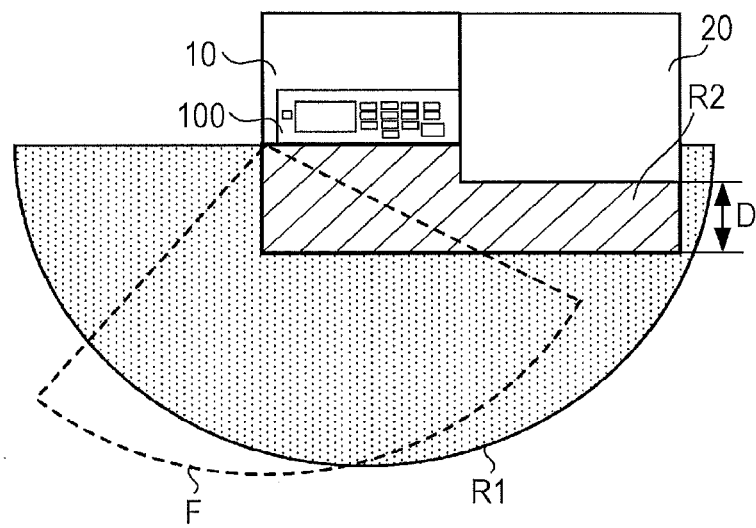
FIGS. 10A and 10B illustrate the setting example of the standstill sensing area of the image forming apparatus.

In the example of FIG. 9, the controller 11 sets the entire length of the standstill sensing area R2 in the direction of depth to be D. As illustrated in FIG. 10A, the position of the front side of the image forming apparatus 10 and the position of the front side of the peripheral device 20 may be different in the direction of depth. In such a case, the controller 11 may set the standstill sensing area R2 so that the distance D is reserved from one of the front sides whichever is closer to the user. If the front side of the image forming apparatus 10 is closer to the user, the controller 11 sets at least the distance D to be reserved from the front side of the image forming apparatus 10.

If the first imaging unit 17 in the image forming apparatus 10 has as the sensing area thereof not only the front side of the image forming apparatus 10 and the front side of the peripheral device 20 but also the lateral side of the image forming apparatus 10, the controller 11 may set the standstill sensing area R2 on the lateral side of the image forming apparatus 10.

Figure 10B:
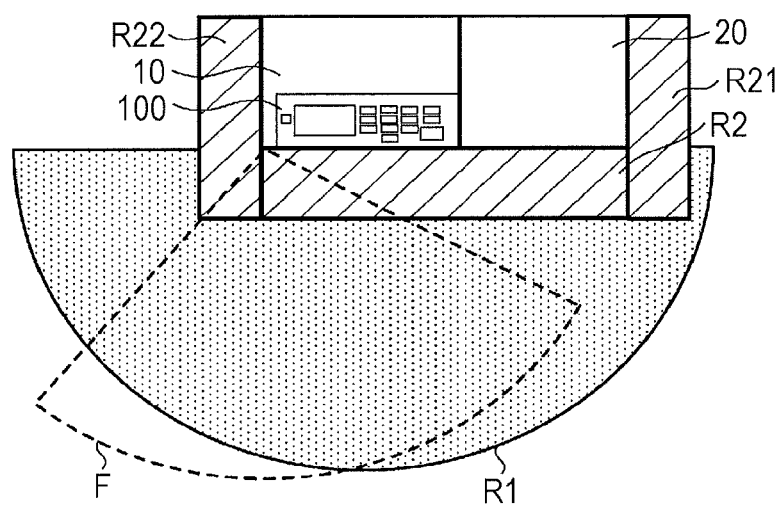

As illustrated in FIG. 10B, the controller 11 may set a standstill sensing area R22 on the lateral side of the image forming apparatus 10 opposite the peripheral device 20. The controller 11 may also set a standstill sensing area R21 on the lateral side of the peripheral device 20 opposite the image forming apparatus 10. With this arrangement, an unwanted shifting of the image forming apparatus 10 to the sleep mode is controlled when the user works on the lateral side of the image forming apparatus 10 or on the lateral side of the peripheral device 20.

When the peripheral device 20 is not connected, the controller 11 may also set the standstill sensing area on the lateral sides of the image forming apparatus 10. The controller 11 may set the standstill sensing area R2 to be longer or shorter in the direction of width instead of setting the standstill sensing area R2 to be approximately equal to the length of the image forming apparatus 10 in the direction of width and the length of the peripheral device 20 in the direction of width.

As described above, the image forming apparatus 10 shifts from the sleep mode to the standard mode upon sensing the approach of a person within the approach sensing area R1. If the person is later no longer present within the standstill sensing area R2 closer to the image forming apparatus 10 than the approach sensing area R1, the image forming apparatus 10 shifts from the standard mode to the sleep mode. The image forming apparatus 10 shifts to the sleep mode more quickly than in the operation in which the image forming apparatus 10 shifts when the person is no longer present from within the approach sensing area R1. If described in terms of imaging by the first imaging unit 17, the image forming apparatus 10 senses the non-presence of the person from within the standstill sensing area R2 by estimating the distance to the person from the captured image from the first imaging unit 17. The image forming apparatus 10 shifts to the sleep mode more quickly than in the operation in which the image forming apparatus 10 shifts to the sleep mode when the presence of the person is no longer sensed from the captured image. The image forming apparatus 10 thus performs power saving control by setting the mode in response to the distance therefrom to the person.

Since the image forming apparatus 10 estimates the distance from the image forming apparatus 10 to the person by analyzing the captured image, the image forming apparatus 10 has a simplified structure with an increase in the number of sensors controlled in comparison with the case in which another type of sensor such as a reflective-type distance sensor is used.

The present invention may be implemented in an exemplary embodiment different from the exemplary embodiment described above. Modifications of the exemplary embodiment described below may be combined.

In the exemplary embodiment described above, the image forming apparatus 10 varies the standstill sensing area R2 by detecting the connection of the peripheral device 20 arranged external to the image forming apparatus 10. Alternatively, the image forming apparatus 10 may vary the standstill sensing area R2 by detecting the movement of a device included in the image forming apparatus 10 or connected to the image forming apparatus 10.

If the peripheral device 20 is moved, the dimensions of the entire image forming apparatus 10 become different, and an area where the working user moves around may also vary. This type of peripheral device 20 includes a movable user interface device, a manual paper feeding tray, and a discharge tray into which processed sheets are discharged. The peripheral device 20 may also include a device that is movably mounted on the image forming apparatus 10. If the device is moved, the external shape and dimensions of the image forming apparatus 10 also change. Upon detecting the movement of the peripheral device 20, the image forming apparatus 10 sets up the standstill sensing area R2 so that the standstill sensing area R2 includes the front side of the image forming apparatus 10 subsequent to the movement of the device.

The dimensions and shapes of the approach sensing area R1 and the standstill sensing area R2 are illustrated for exemplary purposes only, and different dimensions and shapes may be acceptable.

The image forming apparatus 10 may shift from the sleep mode to the standard mode by interpreting the presence of the person within the approach sensing area R1 as the approach of the person to the image forming apparatus 10.

The image forming apparatus 10 may sense the approach of the person by allowing the first imaging unit 17 to continuously operate. In such a case, the image forming apparatus 10 may not include the pyroelectric sensor 16.

The image forming apparatus 10 may include separate image devices, one for sensing the approach of the person in the approach sensing area R1 and the other for sensing the presence of the person within the standstill sensing area R2.

The image forming apparatus 10 may sense the approach of a person within the approach sensing area R1 through a method other than the method that includes using the first imaging unit 17. For example, using multiple distance sensors, the image forming apparatus 10 identifies the location of a person within the approach sensing area R1 and senses the approach of the person in accordance with a change in the identified location with time. The image forming apparatus 10 may sense the presence of a person within the standstill sensing area R2 through a method other than the method that includes using the captured image.

The image forming apparatus 10 may immediately shift to the sleep mode upon sensing the no-presence of the person within the standstill sensing area R2.

The image forming apparatus 10 may vary the standstill sensing area R2 depending on only whether the peripheral device 20 is connected or not. Alternatively, the image forming apparatus 10 may set the standstill sensing area R2 to be fixed regardless of whether the peripheral device 20 is connected or not.

The image forming apparatus 10 may vary not only the standstill sensing area R2 but also the approach sensing area R1. In such a case, the image forming apparatus 10 may set the approach sensing area R1 in concert with a change in the standstill sensing area R2 so that the approach sensing area R1 includes the entire standstill sensing area R2.

The image forming apparatus 10 may not include the second imaging unit 18 if the face authentication of the user is not performed.

The movement of the person may be sensed through a method that does not include calculating the motion vector. The movement of the person may be sensed through any related art method such as a block matching method.

Rather than recognizing a person from a captured image and sensing the movement of the person, the image forming apparatus 10 may sense the movement of the person using a related art technique of extracting a moving object without particularly recognizing the person.

In the exemplary embodiment, the image forming apparatus 10 shifts to the sleep mode when the person is no longer present within the standstill sensing area R2. The mode to which the image forming apparatus 10 shifts may be a mode other than the sleep mode as long as the target mode consumes power less than the standard mode. For example, the image forming apparatus 10 may shift to a mode in which the display operation of the display 14 is stopped to reduce power consumption while the units of the image forming apparatus 10 other than the display 14 are kept operative. The image forming apparatus 10 may operate in another mode different in power consumption from the standard mode and the sleep mode.

In the exemplary embodiment, the image forming apparatus 10 is of a console type. The image forming apparatus 10 may be of a desk-top type. The image forming apparatus 10 may be an apparatus that executes information processing in response to an operation of a user.

The information processing apparatus of the exemplary embodiment may be other than an image forming apparatus having multi-functions. For example, the information processing apparatus may be a scanning device, a copying device, or a facsimile device. The information processing apparatus may be a personal computer or a server apparatus.

Each function of the controller 11 in the image forming apparatus 10 may be implemented by one or more hardware circuits, may be implemented by a processing device that executes one or more programs, or may be implemented by a combination thereof.

If the function of the controller 11 is implemented using a program, the program may be supplied in a state recorded on a non-transitory computer readable recording medium. The non-transitory recording media include magnetic recording media (a magnetic tape, a magnetic disk (such as hard disk drive (HDD) or a flexible disk (FD)), an optical recording medium (such as an optical disk), a magneto-optical recording medium, and a semiconductor memory. The program may be distributed via a network. The present invention may also be interpreted as an information processing method or a power control method performed by the computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
a sensor unit that senses a person within a first distance from the information processing apparatus and a second distance set to be closer to the information processing apparatus than the first distance; and
a shifting unit that sets the information processing apparatus to a first mode when the person is sensed within the first distance by the sensor unit, and shifts the information processing apparatus from the first mode to a second mode that consumes power less than in the first mode when the person is no longer sensed within the second distance by the sensor unit.

2. The information processing apparatus according to claim 1, wherein the shifting unit shifts the information processing apparatus to the second mode on an elapse of a set time period from when the presence of the person is no longer sensed within the second distance by the sensor unit, while stopping the information processing apparatus from shifting to the second mode on the elapse of the set time if the presence of the person is sensed by the sensor unit before the elapse of the set time period.

3. The information processing apparatus according to claim 1, further comprising a detector unit that detects a connection or a movement of a device to be used with and to be external to the information processing apparatus,
wherein the sensor unit varies the second distance in response to the connection or the movement of the device detected by the detector unit.

4. The information processing apparatus according to claim 2, further comprising a detector unit that detects a connection or a movement of a device to be used with and to be external to the information processing apparatus,
wherein the sensor unit varies the second distance in response to the connection or the movement of the device detected by the detector unit.

5. The information processing apparatus according to claim 3, wherein the first distance is set regardless of the connection or the movement of the device detected by the detector unit.

6. The information processing apparatus according to claim 4, wherein the first distance is set regardless of the connection or the movement of the device detected by the detector unit.

7. An information processing method of an information processing apparatus comprising:
sensing a person within a first distance from the information processing apparatus and a second distance set to be closer to the information processing apparatus than the first distance; and
setting the information processing apparatus to a first mode when the person is sensed within the first distance by the sensor unit, and shifting the information processing apparatus from the first mode to a second mode that consumes power less than in the first mode when the person is no longer sensed within the second distance.

8. A non-transitory computer readable medium storing a program causing a computer to execute a process for processing information on an information processing apparatus, the process comprising:
sensing a person at a first distance from the information processing apparatus, a presence of a person within a second distance set to be closer to the information processing apparatus than the first distance; and
setting the information processing apparatus to a first mode when the presence of the person is sensed, and shifting the information processing apparatus from the first mode to a second mode that consumes power less than in the first mode when the presence of the person is no longer sensed within the second distance.

* * * * *